(12) United States Patent
Yamaji et al.

(10) Patent No.: US 8,768,122 B2
(45) Date of Patent: Jul. 1, 2014

(54) OPTICAL MODULE

(75) Inventors: Tadahiro Yamaji, Osaka (JP); Nobuyuki Asashi, Mie (JP); Hiroyuki Yagyu, Osaka (JP); Yutaka Kinugasa, Osaka (JP); Takuya Matsumoto, Mie (JP); Tsutomu Niiho, Osaka (JP)

(73) Assignee: Panasonic Corporation, Osaka (JP)

( * ) Notice: Subject to any disclaimer, the term of this patent is extended or adjusted under 35 U.S.C. 154(b) by 8 days.

(21) Appl. No.: 13/580,238

(22) PCT Filed: Feb. 23, 2011

(86) PCT No.: PCT/JP2011/001039
§ 371 (c)(1),
(2), (4) Date: Aug. 21, 2012

(87) PCT Pub. No.: WO2011/105078
PCT Pub. Date: Sep. 1, 2011

(65) Prior Publication Data
US 2012/0321250 A1      Dec. 20, 2012

(30) Foreign Application Priority Data

Feb. 23, 2010   (JP) .................................. 2010-036777
Sep. 27, 2010   (JP) .................................. 2010-215529

(51) Int. Cl.
*G02B 6/26*     (2006.01)
(52) U.S. Cl.
USPC ............................................. 385/38; 385/88
(58) Field of Classification Search
CPC .... G02B 6/4214; G02B 6/4246; G02B 6/262; G02B 6/4292; G02B 6/4226; G02B 6/4228; G02B 6/44234; G02B 6/423; G02B 6/4244; G02B 6/4202
USPC ............................................... 385/38, 88–92
See application file for complete search history.

(56) References Cited

U.S. PATENT DOCUMENTS 4,897,711 A   1/1990   Blonder et al.
5,179,609 A   1/1993   Blonder et al.
(Continued)

FOREIGN PATENT DOCUMENTS

CN   1743881     3/2006
CN   101359071   2/2009
(Continued)

OTHER PUBLICATIONS

International Search Report issued Mar. 22, 2011 in International (PCT) Application No. PCT/JP2011/001039.
(Continued)

*Primary Examiner* — Ellen Kim
(74) *Attorney, Agent, or Firm* — Wenderoth, Lind & Ponack, L.L.P.

(57) ABSTRACT

Disclosed is an optical module which improves optical coupling efficiency either when configured to receive an optical signal from an optical fiber with a light receiving element or when configured to receive an optical signal from a light emitting element with an optical fiber. The optical module includes: a substrate (1) having in the surface thereof a first groove (1a) and a second groove (1b) formed, with this second groove (1b) being configured to have a substantially V-shaped cross section formed deeper than the first groove and being formed in continuation from the first groove; and an internal waveguide (16) provided within the first groove (1a) of the substrate (1). The optical further modules a mirror portion (15) for changing an optical path, provided at the front end of the first groove (1a); an optical element (12a) mounted on the surface of the substrate (1) so as to face the mirror portion (15), and configured to emit an optical signal to a core (17) of the internal waveguide (16) via the mirror portion (15). Moreover, the optical module further includes an optical fiber (2) having a fiber cladding (22) placed within the second groove (1b) and a fiber core (21) optically connected to the core (17) of the internal waveguide (16).

9 Claims, 17 Drawing Sheets

(56) References Cited

U.S. PATENT DOCUMENTS

| | | |
|---|---|---|
| 6,257,772 B1 * | 7/2001 | Nakanishi et al. ............... 385/89 |
| 6,374,021 B1 | 4/2002 | Nakanishi et al. |
| 6,485,197 B1 | 11/2002 | Kato |
| 6,567,590 B1 * | 5/2003 | Okada et al. .................... 385/49 |
| 6,603,782 B2 * | 8/2003 | Nakanishi et al. ............... 372/36 |
| 6,733,190 B2 * | 5/2004 | Kuhara et al. ................... 385/94 |
| 6,739,764 B2 | 5/2004 | Ido et al. |
| 6,847,053 B2 * | 1/2005 | Kuhara et al. ................... 257/82 |
| 6,895,031 B2 * | 5/2005 | Yamabayashi et al. ......... 372/92 |
| 7,106,980 B2 * | 9/2006 | Nakanishi et al. ............. 398/212 |
| 8,180,189 B2 * | 5/2012 | Okubo et al. .................... 385/49 |
| 2002/0181853 A1 | 12/2002 | Ido et al. |
| 2003/0161603 A1 | 8/2003 | Nadeau et al. |
| 2005/0046928 A1 * | 3/2005 | Bischel et al. ............. 359/341.3 |
| 2005/0157989 A1 | 7/2005 | Korenaga et al. |
| 2005/0281513 A1 | 12/2005 | Choi et al. |
| 2006/0045427 A1 | 3/2006 | Sano et al. |
| 2009/0067799 A1 | 3/2009 | Nakane |
| 2009/0087144 A1 | 4/2009 | Yoshida |

FOREIGN PATENT DOCUMENTS

| | | |
|---|---|---|
| JP | 2-9183 | 1/1990 |
| JP | 6-88925 | 3/1994 |
| JP | 8-264748 | 10/1996 |
| JP | 9-54228 | 2/1997 |
| JP | 2000-294835 | 10/2000 |
| JP | 2002-359426 | 12/2002 |
| JP | 2003-207691 | 7/2003 |
| JP | 2007-3622 | 1/2007 |
| JP | 2008-91516 | 4/2008 |
| JP | 2008-209514 | 9/2008 |

OTHER PUBLICATIONS

Office Action issued Mar. 4, 2014, together with a Search Report, in corresponding Chinese Application No. 201180010281.3, with English translation of Search Report.

* cited by examiner

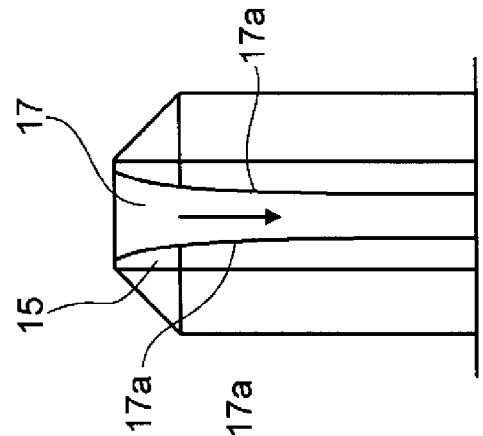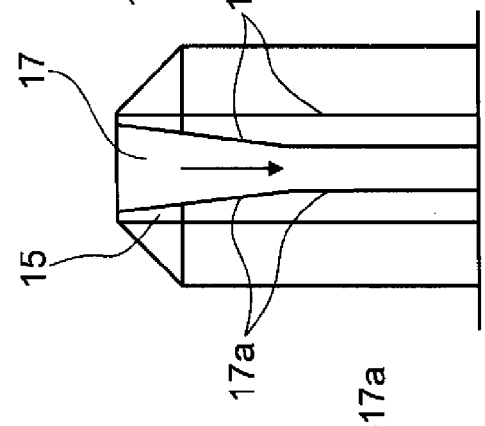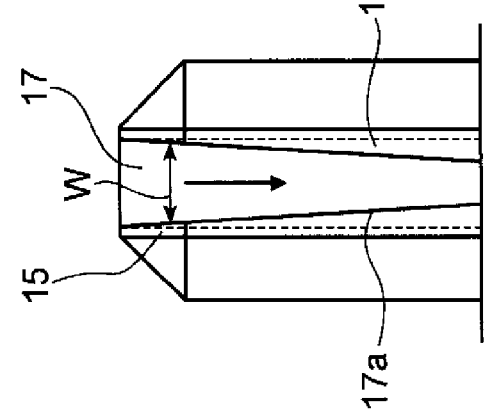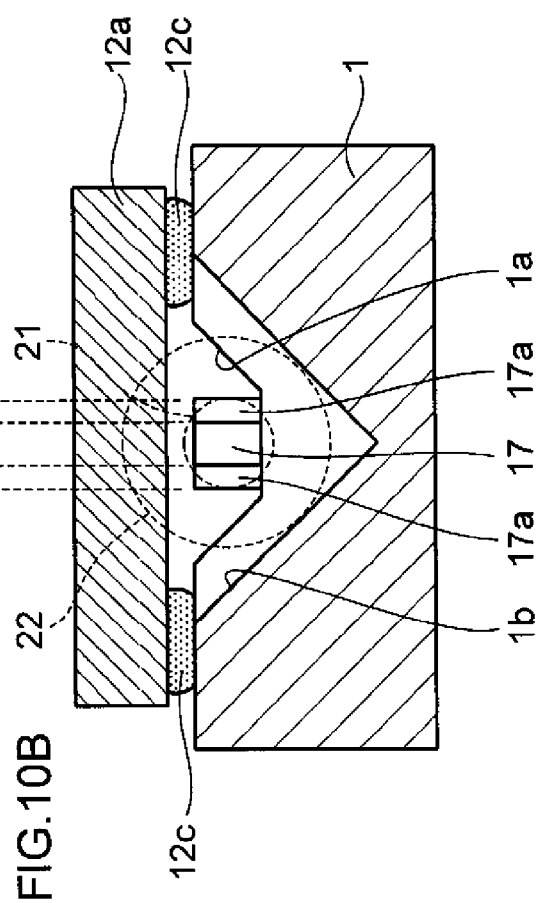

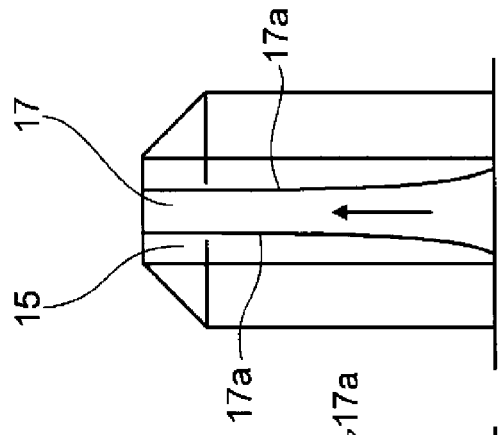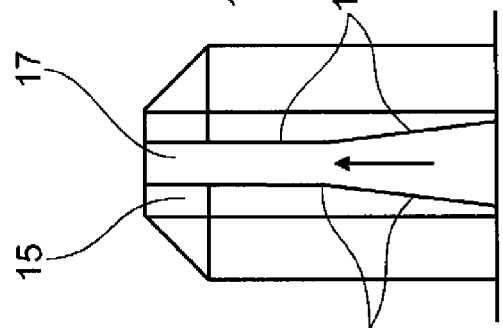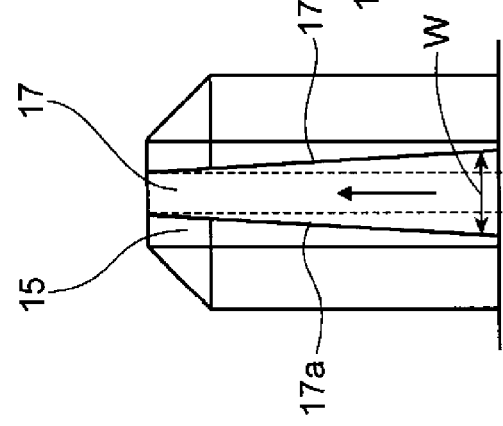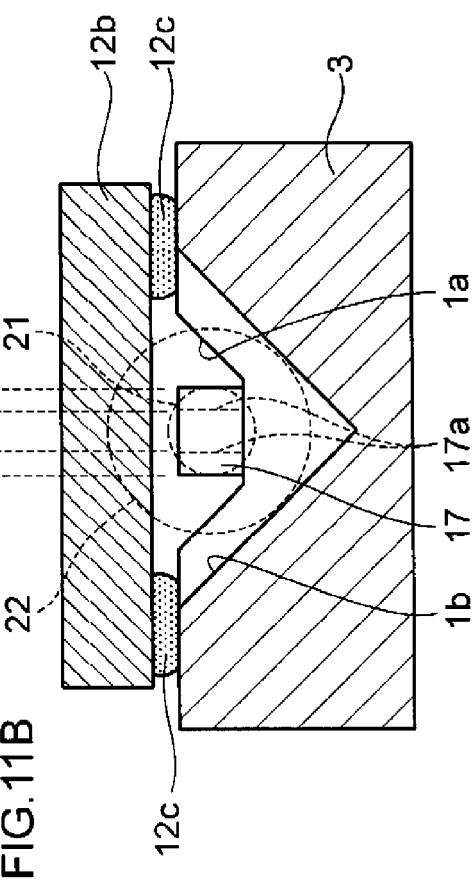

OPTICAL MODULE

TECHNICAL FIELD

This invention relates to an optical module for transmitting or receiving an optical signal.

BACKGROUND ART

Conventionally known optical modules include an optical module described in Patent Document 1. In this optical module, as shown in FIG. 18, a substrate 30 is provided with two V-grooves 31 and 32 having different shapes. A cladding 33b of an optical fiber 33 is fixed to one of the V-grooves, namely the V-groove 31. The cladding 33b is positioned by a rising slope 36 defining the boundary between the V-grooves 31 and 32. A mirror (reflection surface) 34 is formed on the front end of the other V-groove 32. This mirror 34 changes the optical axis of a core 33a of the optical fiber 33. A light receiving element 35 mounted on the substrate 30 receives an optical signal from the optical fiber 33.
Patent Document 1: Japanese Patent Application Publication No. H9-54228

However, in the optical module described above, there is a long distance from the front end 33c of the core 33a of the optical fiber 33 to the mirror 34. This cause a light flux emitted from the core 33a to be expanded, resulting in deterioration of optical coupling efficiency.

SUMMARY OF THE INVENTION

This invention has been made in order to solve the aforementioned problem. An object of the invention is to provide an optical module capable of improving the optical coupling efficiency when it is configured to receive an optical signal from an optical fiber with a light receiving element as well as when it is configured to receive an optical signal with an optical fiber.

In order to solve the problem, this invention provides an optical module including: a substrate having in a surface thereof at least one first groove and a second groove which has a substantially V-shaped cross section formed deeper than the first groove, and which is formed in continuation from the first groove; an internal waveguide provided within the first groove of the substrate; a mirror portion for changing the optical path, provided at a front end of the first groove; an optical element mounted on the surface of the substrate so as to face the mirror portion, and designed to emit an optical signal to a core of the internal waveguide via the mirror, or receive an optical signal from the core of the internal waveguide via the mirror portion; and an optical fiber having a fiber cladding placed within the second groove and a fiber core optically connected to the core of the internal waveguide.

The configuration may be such that when the optical element is a light emitting element, the core of the internal waveguide is tapered to form such slopes that the width between opposite side faces of the core becomes gradually smaller from the mirror portion toward a connection end of the core with the fiber core of the optical fiber.

The configuration may be such that when the optical element is a light receiving element, the core of the internal waveguide is tapered to form such slopes that the width between opposite side faces of the core becomes gradually smaller from a connection end thereof with the fiber core of the optical fiber toward the mirror portion.

The configuration may be such that the width of the core of the internal waveguide is set smaller than the width of the upper end of the first groove, and preferably set to substantially the same as the width of the fiber core.

The configuration may be such that the first groove has a substantially trapezoidal cross-section, and a bottom face of the first groove has a greater width than the width of the core of the internal waveguide.

The configuration may be such that a third groove which has a substantially V-shaped cross section and which is deeper than the second groove is formed in continuation from the second groove in the surface of the substrate; and a coating of the optical fiber is placed within the third groove.

The configuration may be such that the substrate is placed on another substrate having a greater size than the substrate, the coating of the optical fiber is fixed to said another substrate.

In the configuration in which a third groove which has a substantially V-shaped cross section and is deeper than the second groove is formed in continuation from the second groove in the surface of the substrate, and the coating of the optical fiber is placed within the third groove, the configuration may be such that the substrate is placed on another substrate having a greater size than the substrate, the coating of the optical fiber is fixed to said another substrate.

The configuration may be such that the substrate is placed on another substrate having a greater size than the substrate, the covering body is fixed to the outer periphery of the coating of the optical fiber, and the covering body of the optical fiber is fixed to said another substrate.

The configuration may be such that a plurality of first grooves are arranged on the substrate while being separated from each other.

According to this invention, an internal waveguide having a core is provided in a first groove of a substrate, and an fiber core of an optical fiber arranged in a second groove of the substrate is optically connected to the core of the internal waveguide. When an optical element is a light emitting element, the optical element emits an optical signal to the core of the internal waveguide via a mirror portion, whereas when an optical element is a light receiving element, the optical element receives an optical signal from the core of the internal waveguide via the mirror portion.

Since the internal waveguide is interposed between the mirror portion and the front end of the fiber core of the optical fiber, neither a light flux emitted by the light emitting element nor a light flux emitted from the fiber core of the optical fiber is expanded. Accordingly, propagation loss of the optical signal is substantially eliminated between the mirror portion and the front end of the fiber core of the optical fiber, whereby the optical coupling efficiency can be improved.

BRIEF DESCRIPTION OF THE DRAWINGS

FIG. 10 are diagrams showing modifications of the core of the internal waveguide of the light emitting element, FIG. 10A being a plan view, FIG. 10B being a front cross-sectional view of FIG. 10A, FIGS. 10C and 10D being plan views showing different modifications.

FIG. 11 are diagrams showing a modifications of the core of the internal waveguide of the light emitting element, FIG. 11A being a plan view, FIG. 11B being a front cross-sectional view of FIG. 11A, FIGS. 11C and 11D being plan views showing different modifications.

EMBODIMENTS FOR CARRYING OUT THE INVENTION

Figure 1:
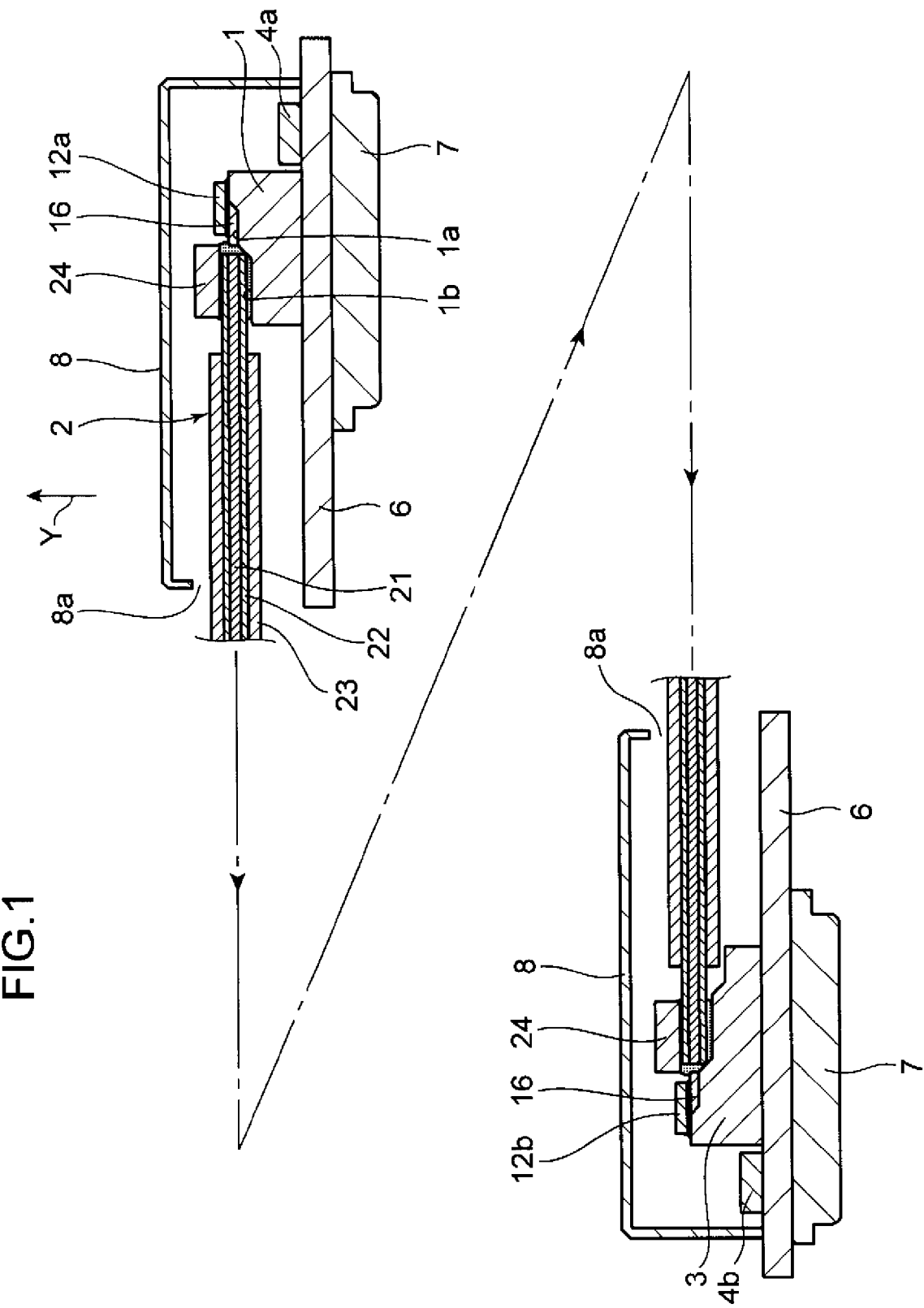
FIG. 1 is a schematic side view showing an optical module according to an embodiment of this invention.
Figure 2A:
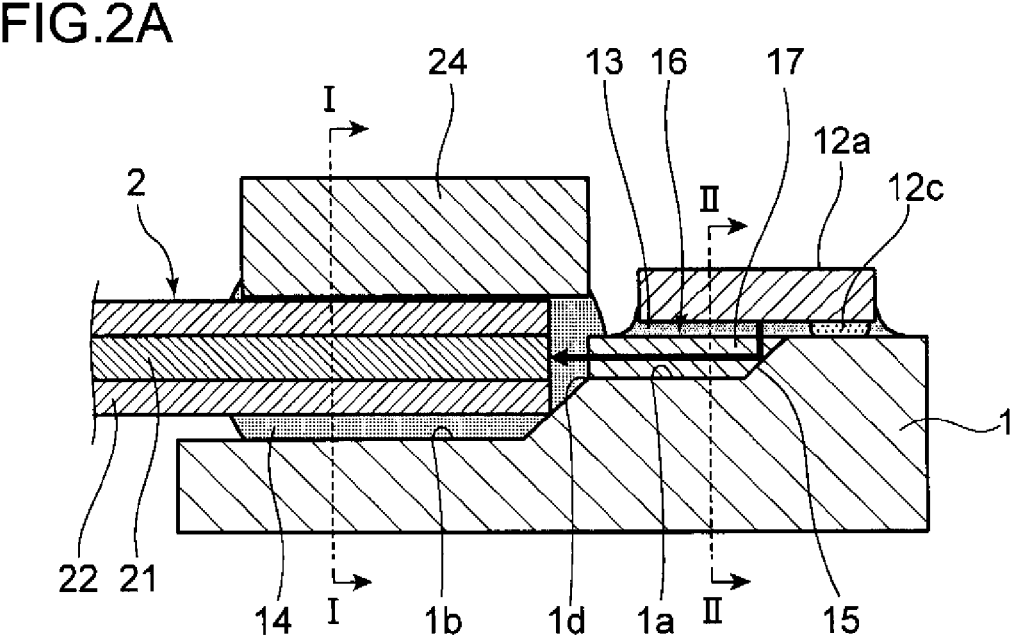
FIG. 2 are diagrams showing a first substrate of a light-emitting optical module shown in FIG. 1, FIG. 2A being a side cross-sectional view, FIG. 2B being a cross-sectional view taken along the line I-I in FIG. 2A, FIG. 2C being a cross-sectional view taken along the line II-II in FIG. 2A.
Figure 2B:
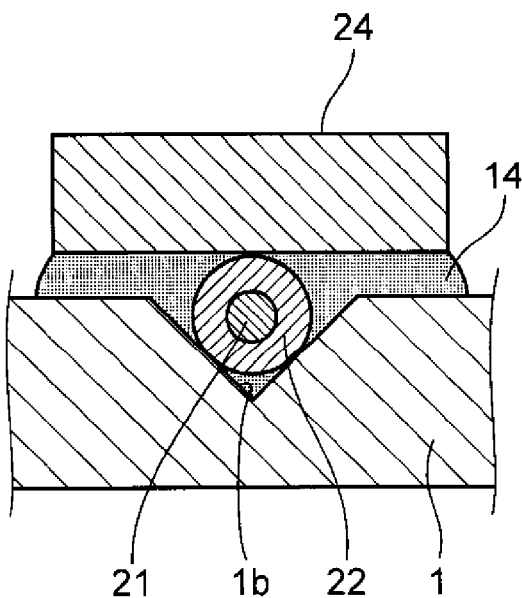
Figure 2C:
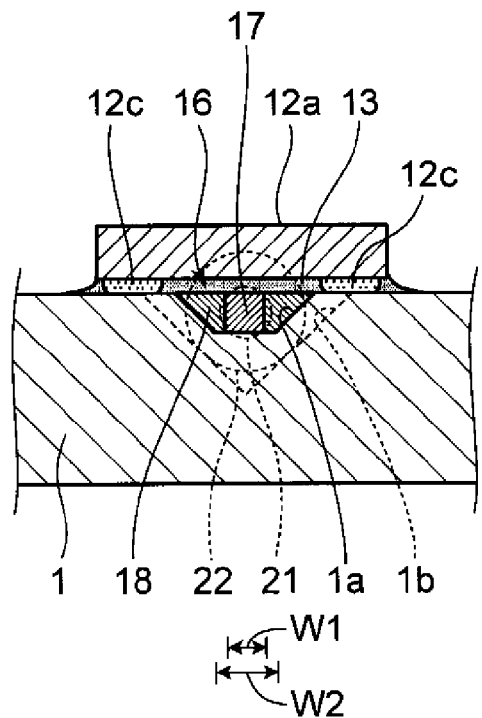
Figure 3A:
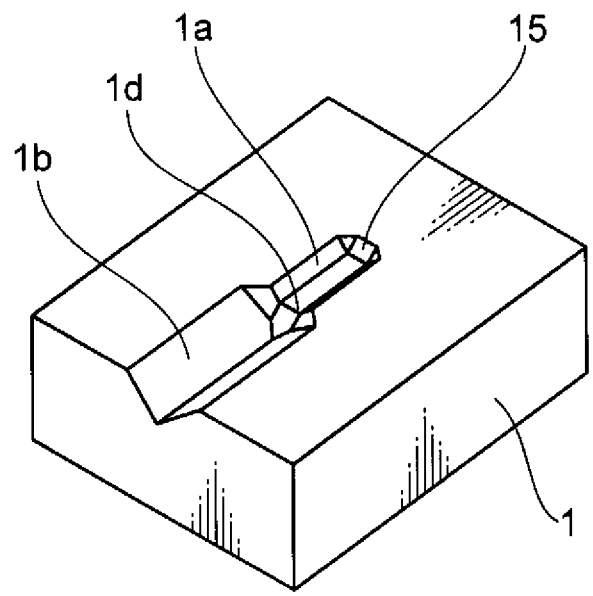
FIG. 3 are diagrams showing the first substrate, FIG. 3A being a perspective view, FIG. 3B being a perspective view of the first substrate having an internal waveguide formed therein.
Figure 3B:
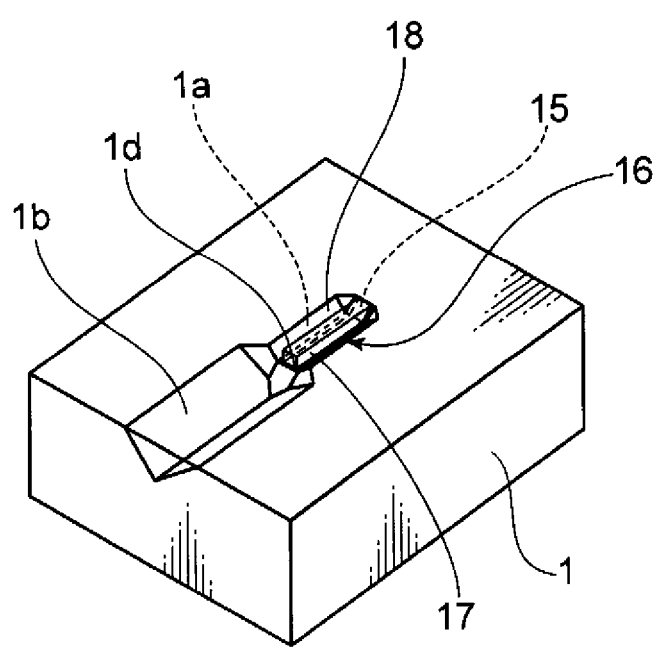
Figure 4A:
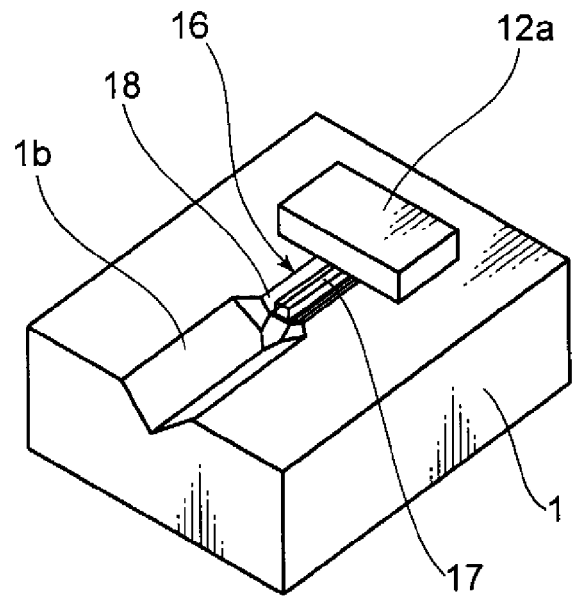
FIG. 4 are diagrams showing the first substrate, FIG. 4A being a perspective view showing the first substrate having a light emitting element mounted thereon, FIG. 4B being a perspective view showing the first substrate having an optical fiber inserted thereto.
Figure 4B:
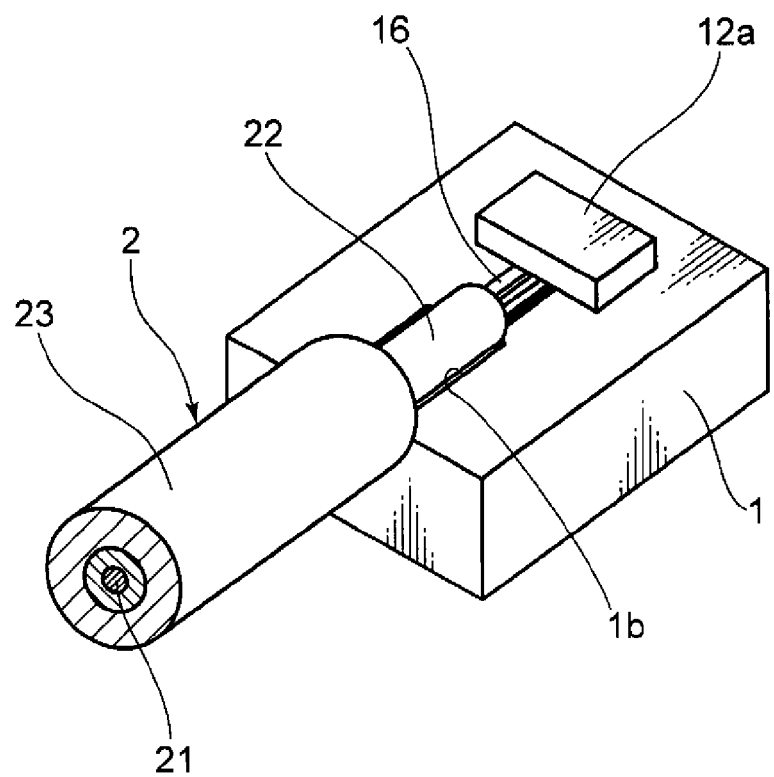

Preferred embodiments of this invention will be described in detail with reference to the drawings. FIG. 1 is a schematic side view of an optical module according to this invention. FIGS. 2A to 2C are diagrams illustrating a first substrate 1 of the light-emitting optical module of FIG. 1. FIG. 2A is a side cross-sectional view, FIG. 2B is a cross-sectional view taken along the line I-I in FIG. 2A, and FIG. 2C is a cross-sectional view taken along the line II-II in FIG. 2A. FIGS. 3A and 3B are diagrams illustrating the first substrate 1. FIG. 3A is a perspective view, and FIG. 3B is a perspective view of the first substrate 1 having an internal waveguide formed therein. FIGS. 4A and 4B are diagrams illustrating the first substrate 1. FIG. 4A is a perspective view of the first substrate 1 having a light emitting element 12a mounted thereon, and FIG. 4B is a perspective view of the first substrate 1 having an optical fiber 2 inserted therein. FIG. 5 is a perspective view showing the first substrate having a presser block 24 fixed thereto.

As shown in FIG. 1, the optical module has a first substrate (mount substrate) 1 as a light-emitting substrate, a first substrate (mount substrate) 3 as a light-receiving substrate, and an optical fiber 2 for optically coupling the first substrates 1 and 3. It should be noted that in the description below, a vertical direction (indicated by the arrow Y) in FIG. 1 shall be referred to as the vertical direction (height direction), a direction orthogonal to the plane of paper shall be referred to as a transverse direction (width direction), the left side as viewed in FIG. 1 shall be referred to as the front side, and the right side shall be referred to as the rear side.

The first substrates 1 and 3 are required to have rigidity in order to avoid effects of heat during mounting and effects of stress due to usage environment. In case of light transmission, light must be transmitted from a light emitting element to a light receiving element at an efficiency higher than a predetermined percentage. Therefore, the optical elements have to be mounted with high precision and positional variation during use must be suppressed as much as possible. In order to address these requirements, silicon (Si) substrates are used as the first substrates 1 and 3 in this embodiment.

When the first substrates 1 and 3 are silicon substrates, grooves can be formed by etching the surfaces of the first substrates 1 and 3 with high precision by utilizing crystal orientation of silicon. By utilizing these grooves, highly precise mirror portions 15 (to be described later) can be formed. Further, internal waveguides 16 (to be described later) can be formed within the grooves. Silicon substrates have an excellent flatness.

The first substrates 1 and 3 are respectively arranged on the top surfaces (upper faces) of second substrates which are greater in size (separate substrates, such as interposer substrates) 6. A connector 7 is attached to the rear surface (lower face) of each of the second substrates 6 for connecting the substrate to another circuit device.

A light emitting element 12a is mounted on the top surface (upper face) of the first substrate 1 by means of a bump 12c with its light-emitting face facing downward (see FIG. 2). The light emitting element 12a converts an electric signal into an optical signal. An IC substrate (signal processing unit) 4a for transmitting an electric signal to the light emitting element 12a is mounted on the surface of the second substrate 6. The IC substrate 4a has an IC circuit formed therein.

In this embodiment, a vertical cavity surface emitting laser (VCSEL) which is a semiconductor laser is employed as the light emitting element 12a. The light emitting element 12a may be a LED or the like.

The IC substrate 4a is a driver IC for driving the VCSEL, and is arranged in the vicinity of the light emitting element 12a. The light emitting element 12a and the IC substrate 4a are connected to wiring patterns formed on the surfaces of the first substrate 1 and the second substrate 6.

As shown in FIG. 3A, there are formed, in the surface of the first substrate 1, a first groove (groove for formation of a waveguide) 1a having a substantially trapezoidal cross-section and a second groove 1b having a substantially V-shaped cross-section and having a greater depth than the first groove 1a. The first and second grooves are formed continuously in the longitudinal direction.

A mirror portion 15 for changing an optical path is formed at the front end of the first groove 1a such that the mirror portion 15 is located directly below the light emitting element 12a. The mirror portion 15 bends the optical path by 90 degrees.

As shown in FIG. 3B, an internal waveguide 16 optically coupled with the light emitting element 12a of the first substrate 1 is provided within the first groove 1a of the first substrate 1. This internal waveguide 16 is extended from the mirror portion 15 toward the second groove 1b up to a position slightly retreated from the rear end 1d of the first groove 1a toward the mirror portion 15.

The internal waveguide 16 is composed of a core 17 propagating light, and having a substantially square cross-section and a high refractive index, and a cladding 18 having a lower refractive index than the core.

As shown in FIG. 2C, the left and side faces (opposite side faces) of the core 17 are covered with a cladding 18. Although not shown in the drawings, the top surface of the core 17 is also covered with a thin cladding 18.

As shown in FIG. 4A, the light emitting element 12a is mounted at a predetermined position on the surface of the first substrate 1 where the internal waveguide 16 is provided. The space between the light emitting element 12a and the core 17 is filled with an adhesive optical transparent resin 13 as shown in FIG. 2A.

Returning to FIG. 1, description will be made of the light-receiving first substrate 3. This first substrate 3 for receiving light is basically configured in the same manner as the first substrate 1 for emitting light. The light-receiving first substrate 3 is different from the light-emitting first substrate 1 in that a light receiving element 12b for converting an optical signal to an electric signal is mounted on the top surface (upper face) of the light-receiving first substrate 3 by means of a bump with its light-receiving face downward, and an IC substrate (signal processing unit) 4b having an IC circuit for transmitting an electric signal to the light receiving element 12b is mounted on the surface of the second substrate 6. A PD is employed as this light receiving element 12b, and the IC substrate 4b is an element for converting current and voltage such as a Trans-impedance Amplifier (TIA).

The light-emitting first substrate 1, the light-receiving first substrate 3, and the IC substrates 4a and 4b are shielded with a shield case 8 attached to the surface of the second substrate 6. The optical fiber 2 passes through a through hole 8a of the shield case 8.

Next, description will be made of the optical fiber 2. As shown in FIG. 1 and FIG. 5, the optical fiber 2 has in the inside thereof a fiber core 21 which is capable of optically coupling the core 17 of the internal waveguide 16 in the light-emitting first substrate 1 with the core 17 of the internal waveguide 16 in the light-receiving first substrate 3. The optical fiber 2 is a code type, that is, includes this fiber core 21, a fiber cladding 22 enclosing the outer periphery of the fiber core 21, and a coating 23 covering the outer periphery of the fiber cladding 22. The fiber core 21, the fiber cladding 22 and the coating 23 are arranged concentrically and the optical fiber 2 composed of these has a circular cross section.

As shown in FIG. 1, the optical fiber 2 passes through the through hole 8a of the shield case 8, and the coating 23 is removed in the vicinity of the second groove 1b in the first substrate 1. Therefore, the fiber cladding 22 is exposed in this region where the coating 23 is removed.

As shown in FIGS. 2A, 2C and 4B, the fiber cladding 22 of the optical fiber 2 is placed within the second groove 1b of the first substrate 1, while the fiber cladding 22 is positioned by a rising slope formed at the boundary with the first groove 1a.

Optical coupling is achieved in a positional relationship in which the core 17 of the internal waveguide 16 in the first substrate 1 is matched with the optical axis of the fiber core 21 of the optical fiber 2.

There is a gap in a range of 0 to 200 μm between the end face of the core 17 of the internal waveguide 16 in the first substrate 1 and the end face of the fiber core 21 of the optical fiber 2. While a desirable range for the gap depends on the sizes of the cores 17 and 21, it is generally desirable that the gap is in a range of 0 to 60 μm.

Figure 5A:
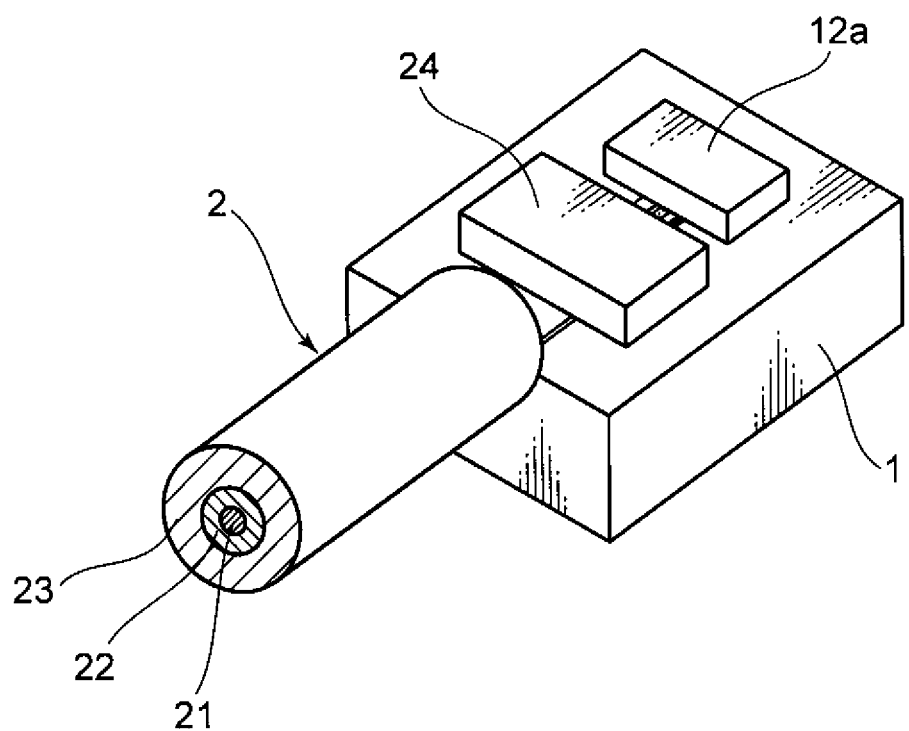
FIG. 5A is a perspective view showing the first substrate having a presser block fixed thereto.
Figure 5B:
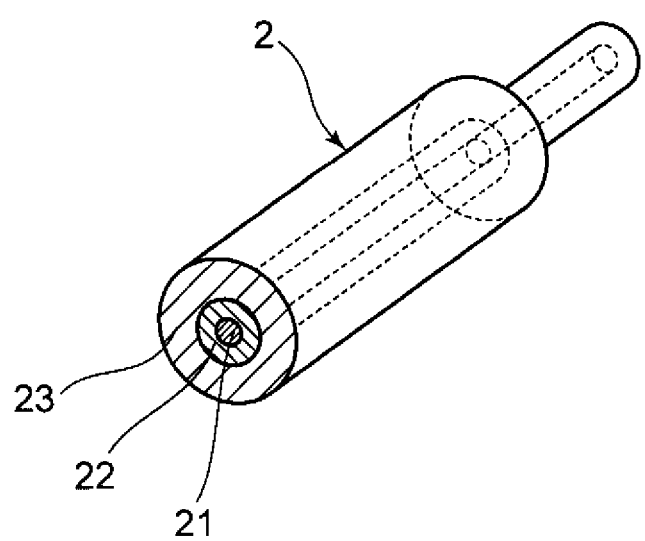
FIG. 5B is a perspective view showing an optical fiber.

As shown in FIGS. 2A and 5A, a presser block 24 is arranged on top of the fiber cladding 22 of the optical fiber 2 on the upper side of the first substrate 1. A space between the presser block 24 and the second groove 1b is filled with an adhesive 14.

Thus, the front-end region of the fiber cladding 22 of the optical fiber 2 is pressed against the second groove 1b by the presser block 24. The front-end region of the fiber cladding 22 is adhesively fixed to the first substrate 1 together with the presser block 24 by means of the adhesive 14.

In the optical module configured as described above, the internal waveguide 16 including the core 17 and the cladding 18 is provided in the first groove 1a of the first substrate 1. The fiber core 21 of the optical fiber 2 placed in the second groove 1b of the first substrate 1 is optically connected to the core 17 of the internal waveguide 16. The first substrate 1 for light-emitting having the light emitting element 12a as an optical element emits an optical signal to the core 17 of the internal waveguide 16 via the mirror portion 15, and the first substrate 3 for light-receiving having the light receiving element 12b as an optical element receives the optical signal from the core 17 of the internal waveguide 16 via the mirror portion 15.

Since the internal waveguide 16 is thus interposed between the mirror portion 15 and the front end of the fiber core 21 of the optical fiber 2, neither a light flux emitted from the light emitting element 12a nor a light flux emitted from the fiber core 21 of the optical fiber 2 is expanded. Therefore, propagation loss of an optical signal is minimized between the mirror portion 15 and the front end of the fiber core 21 of the optical fiber 2, whereby the optical coupling efficiency is improved.

Figure 6:
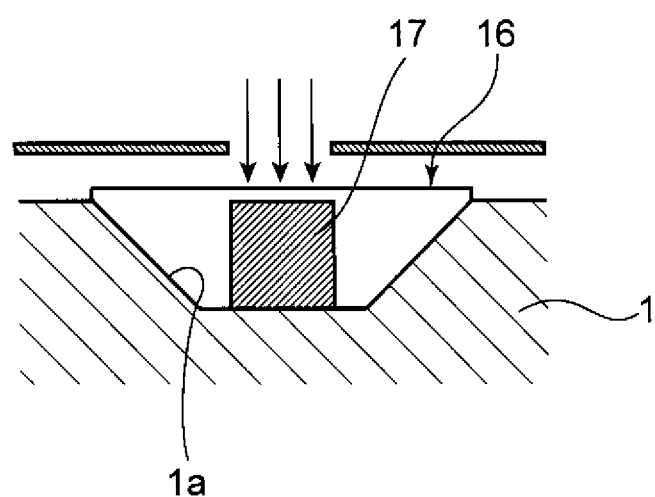
FIG. 6 is a front cross-sectional view showing a relationship between the bottom face of the first groove and a core of the internal waveguide.

The bottom face of the first groove 1a is formed to be wider than the core 17 of the internal waveguide 16, whereby as shown in FIG. 6, undesired reflection can be eliminated when the core 17 of the internal waveguide 16 is patterned (photocured) during formation of the core 17. This makes it possible to form the core into a highly precise shape.

In the internal waveguide 16 according to the embodiment shown in FIGS. 1 to 6, the first groove 1a serving as a groove for formation of a waveguide in the first substrate 1 is formed into a substantially trapezoidal shape in cross-section, while the core 17 is formed into a substantially square shape in cross-section, and the left and right side faces of the core 17 are covered with the cladding 18.

Figure 7A:
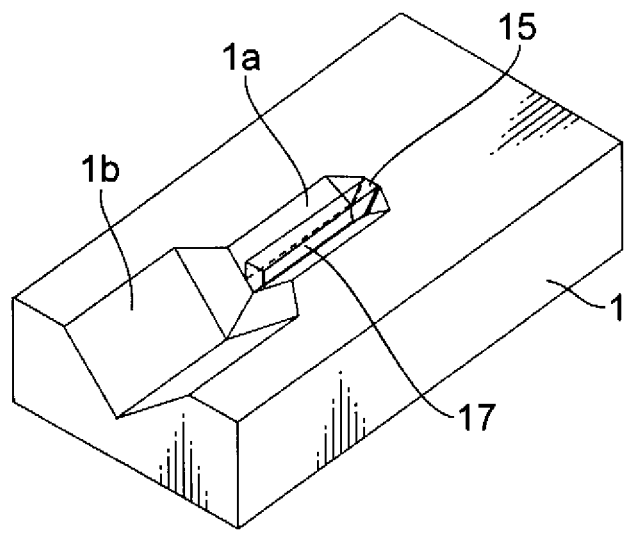
FIG. 7 are diagrams showing the first substrate according to a first modification, with FIG. 7A being a perspective view and FIG. 7B being a front cross-sectional view.

However, the internal waveguide 16 is not limited to this type. For example, like the internal waveguide 16 shown in FIGS. 7A and 7B, the first groove 1a in the first substrate 1 may be formed into a substantially V-shaped cross-section which is shallower than the second groove 1b, while the core 17 may be formed into a substantially pentagonal shape in cross section to fit the first groove 1a, and the left and right side faces of the core 17 may be covered with the cladding 18.

Figure 8:
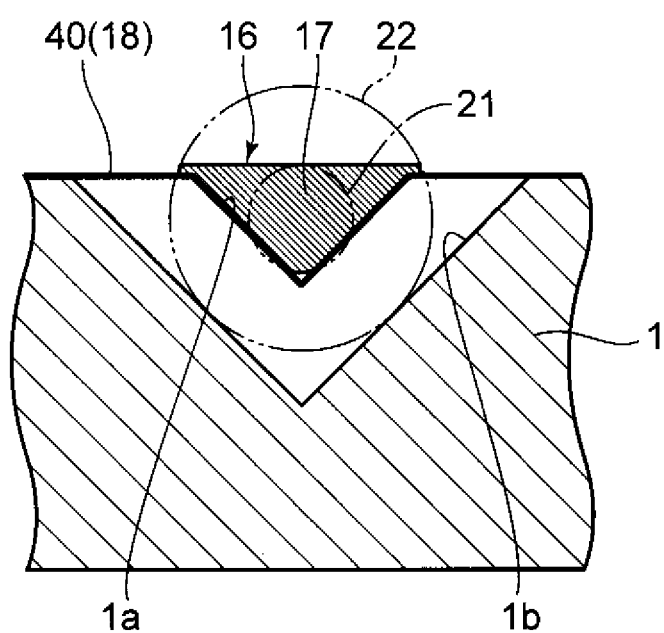
FIG. 8 is a front cross-sectional view showing the first substrate according to a second modification.

Further, when a silicon oxide film 40 is formed for insulation not only on the surface of the first substrate 1 but also on the surface in the first groove 1a like the internal waveguide 16 shown in FIG. 8, this silicon oxide film 40 functions as a cladding 18 with a lower refractive index than that of the core 17. Therefore, the core 17 may be formed into a substantially inverted triangular shape in cross-section by filling with a core resin the entire inside of the first groove 1a having the silicon oxide film (corresponding to the cladding 18) 40 formed thereon.

In the internal waveguide 16 shown in FIG. 8, the entire inside of the first groove 1a serves as the core 17, and hence a light flux emitted from the light emitting element 12a may possibly be expanded in the core 17 in its width direction and part of the light flux may not reach the fiber core 21 of the optical fiber 2.

Figure 7B:
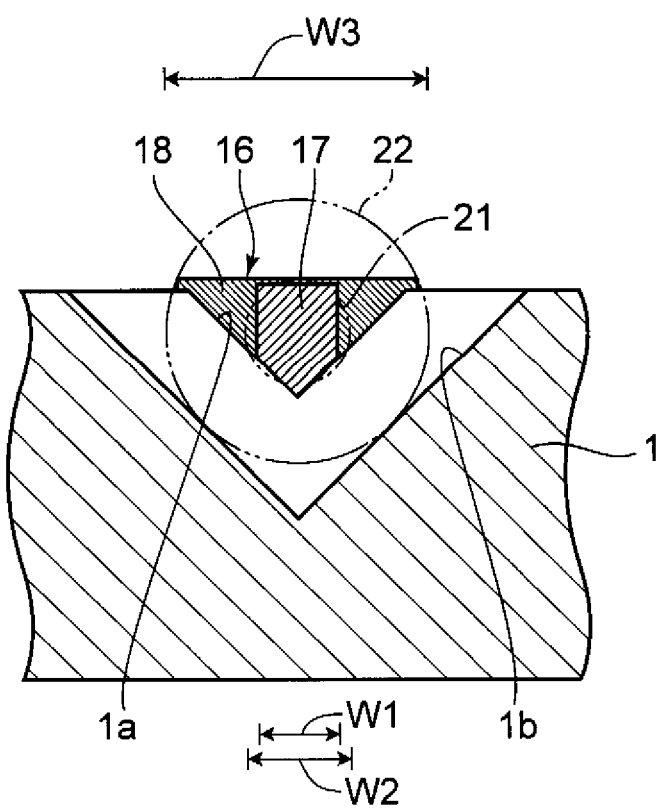

In order to address this problem, as shown in FIG. 7B, a width W1 of the core 17 is made substantially the same as a width W2 of the fiber core 21 so that substantially all of the light flux is allowed to reach the fiber core 21 of the optical fiber 2 and hence the optical coupling efficiency can be improved. It should be noted that the width W1 of the core 17 need not necessarily be the same as the width W2 of the fiber core 21 as long as the width W1 of the core 17 is smaller than a width W3 of the upper end of the first groove 1a. The same can be said of the case in which as shown in FIG. 2C, the core 17 has a substantially square cross-section.

In the light-emitting first substrate 1 in which an optical element is the light emitting element 12a, the core 17 of the internal waveguide 16 may be formed into a tapered shape as shown in FIGS. 10A and 10B such that the width W between the opposite side faces 17a is linearly and gradually reduced from the mirror portion 15 toward its connection end connected to the fiber core 21 of the optical fiber 2. The opposite side faces 17a may form staged linear slopes as shown in FIG. 10C, or the opposite side faces 17a may form curved slopes as shown in FIG. 10D.

In contrast, in the light-receiving first substrate 3 in which an optical element is the light receiving element 12b, as shown in FIGS. 11A and 11B, the core 17 of the internal waveguide 16 may be tapered from the connection end connected to the fiber core 21 of the optical fiber 2 toward the mirror portion 15, such that the width W between the opposite side faces 17a is reduced linearly and gradually. The opposite side faces 17a may form staged linear slopes as shown in FIG. 11C, or the opposite side faces 17a may form curved slopes as shown in FIG. 11D.

In this manner, when the optical element is the light emitting element 12a, the light flux emitted from the light emitting element 12a can be converged by tapering the core 17 of the internal waveguide 16 (in other words, by forming the core 17 so as to become thinner toward the front end). When the optical element is the light receiving element 12b, the light flux emitted from the fiber core 21 of the optical fiber 2 can be converged by reversely tapering the core 17 of the internal waveguide 16 (in other words, by forming the core 17 so as to be thinner toward the rear end). Accordingly, in any of these cases, the optical coupling efficiency can be improved further more.

Figure 9A:
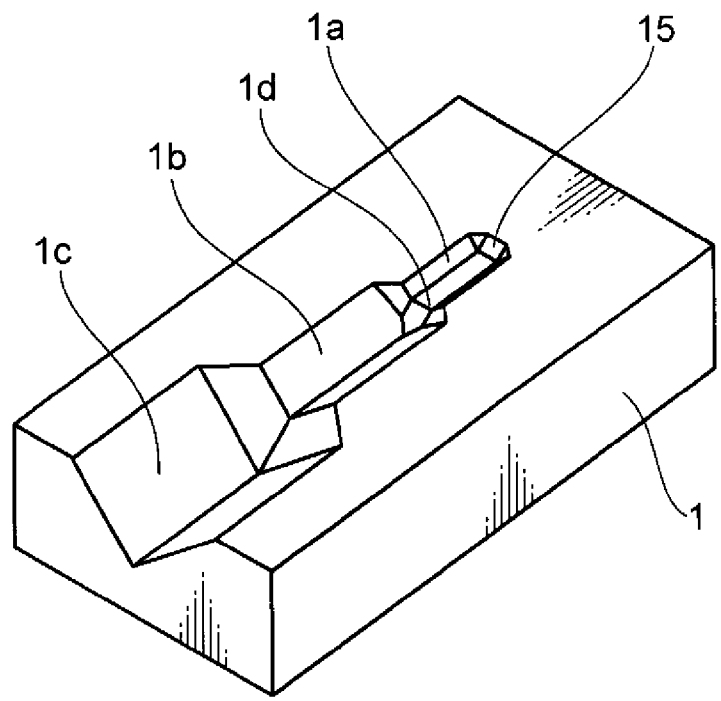
FIG. 9 are diagrams showing the first substrate according to a third modification, with FIG. 9A being a perspective view and FIG. 9B being a side cross-sectional view.
Figure 9B:
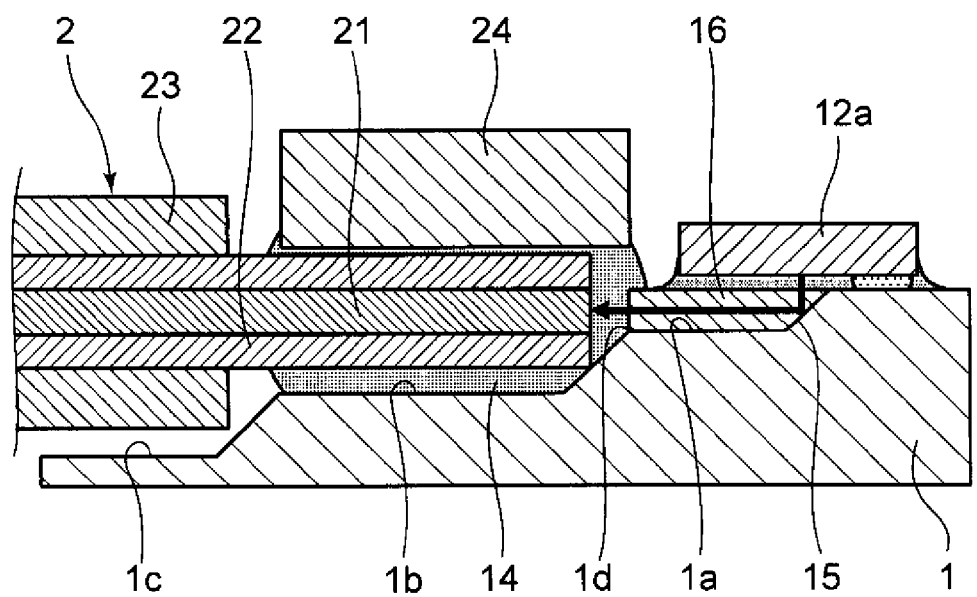

As shown in FIGS. 9A and 9B, a third groove 1c which has a substantially V-shaped cross-section and is deeper than the second groove 1b is formed in the surface of the first substrate 1 in continuation from the second groove 1b. The coating 23 of the optical fiber 2 can be placed within the third groove 1c.

In this manner, since the coating 23 of the optical fiber 2 also can be placed within the third groove 1c in the first substrate 1, stress from the optical fiber 2 can be prevented from concentrating at the boundary with the coating 23 of the fiber cladding 22.

When the coating 23 is adhesively fixed to the third groove 1c with an adhesive in the same manner as the fiber cladding 22, the fixture strength of the optical fiber 2 is improved.

Further, even when bending force or tensile force acts on the optical fiber 2 from the outside of the module, it does not affect the optical coupling with the internal waveguide 16, and hence the optical coupling efficiency is not deteriorated.

Figure 12:
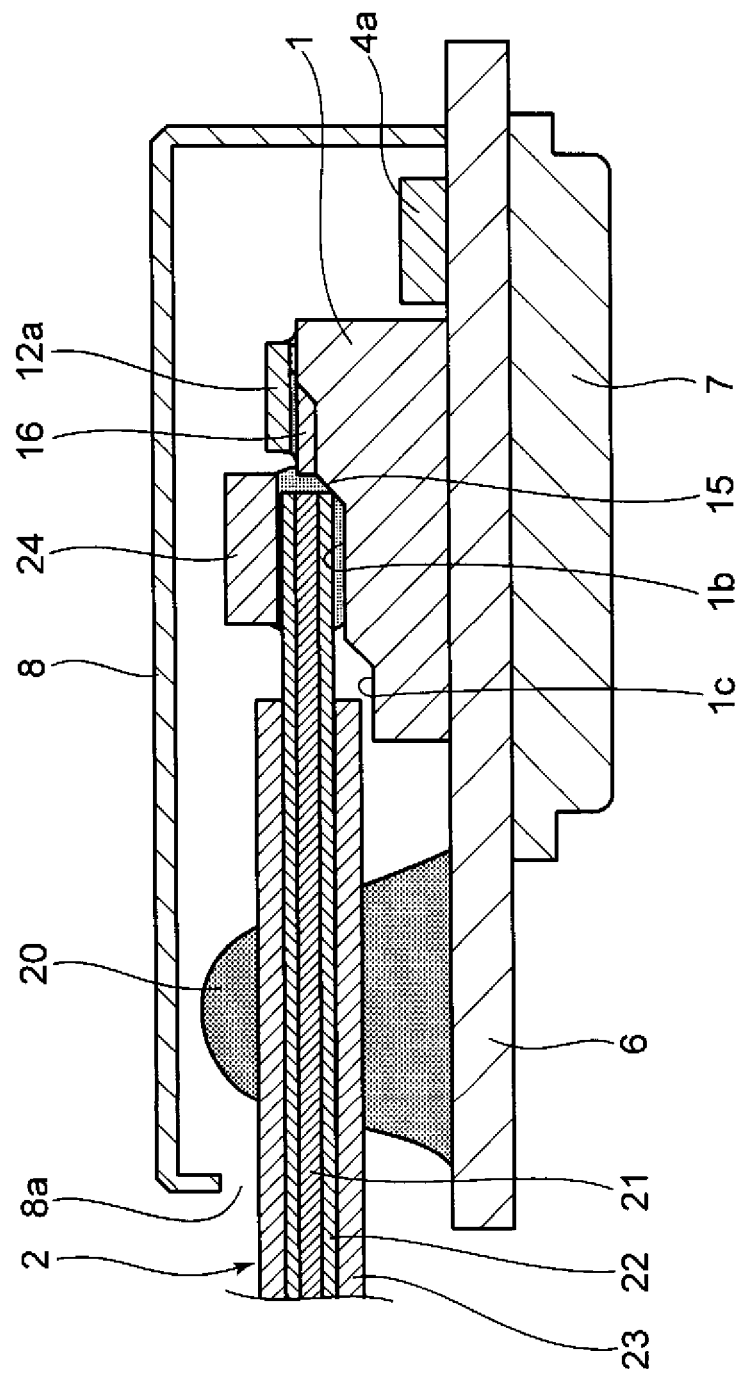
FIG. 12 is a side cross-sectional view showing a first example of a second substrate having a coating of the optical fiber adhesively fixed thereto.

When the coating 23 is not adhesively fixed to the third groove 1c, the coating 23 of the optical fiber 2 can be fixed to the second substrate 6 by means of an adhesive 20 mounded (applied so as to project upward) on the surface of the second substrate 6 as shown in FIG. 12.

In this manner, the coating 23 of the optical fiber 2 can be placed and fixed to the second substrate 6, and hence the fixture strength of the optical fiber 2 can be improved. Further, even when bending force or tensile force acts on the optical fiber 2 from the outside of the module, it does not affect the optical coupling with the internal waveguide 16, and hence the optical coupling efficiency is not deteriorated. The fixture strength will be improved even more by employing in conjunction therewith the arrangement in which the coating 23 of the optical fiber 2 is placed in and fixed to the third groove 1c of the first substrate 1.

Figure 13:
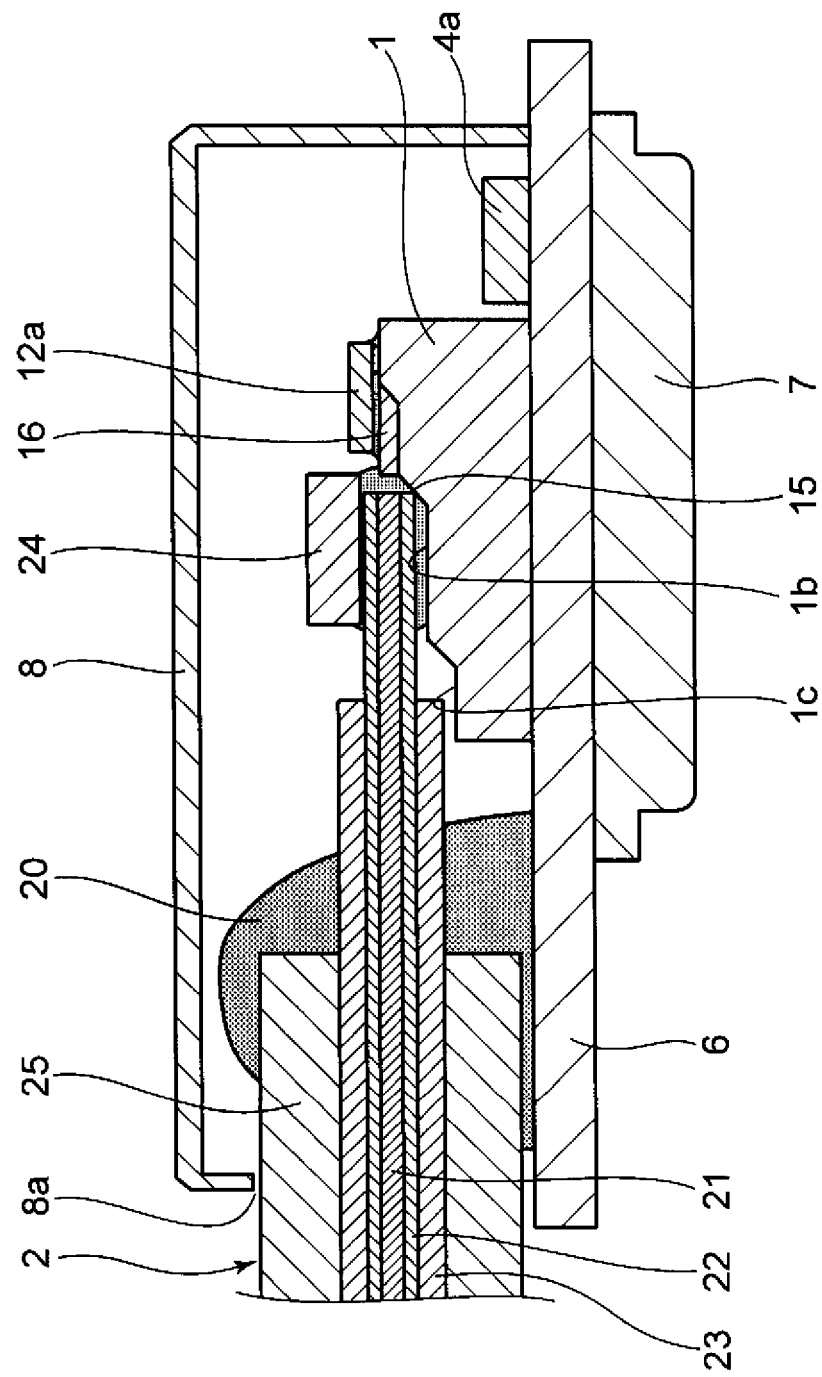
FIG. 13 is a side cross-sectional view showing a second example of the second substrate having the coating of the optical fiber adhesively fixed thereto.

When a tubular covering body 25 is fitted over the coating 23 of the optical fiber 2 as shown in FIG. 13, the coating 23 of the optical fiber 2 and the covering body 25 can be fixed to the second substrate 6 with the adhesive 20. This covering body 25 is designed to have such an outer diameter that the optical fiber 2 can be kept in parallel to the substrates 1 and 6. The covering body 25 need not necessarily be fitted over the coating 23 as long as the covering body 25 covers the outer periphery of the coating 23.

The coating 23 is a layer with a thickness of about 5 to 10 μm and formed of a UV curing resin or the like. For example, the covering body 25 may be formed of PVC or nylon, or a thermoplastic polyester elastomer (e.g. Hytrel®), and has an outer diameter of about 900 micrometers when the optical fiber has a single core.

The configuration as described above enables the covering body 25 to be placed on the second substrate 6 and to be fixed to the second substrate 6 together with the coating 23 of the optical fiber 2. This enhances the fixture strength of the optical fiber 2. In addition, even if bending force or tensile force acts on the optical fiber 2 from the outside of the module, it does not affect the optical coupling with the internal waveguide 16, and hence the optical coupling efficiency is not deteriorated. Further, when the arrangement of placing and fixing the coating 23 of the optical fiber 2 in the third groove 1c of the first substrate 1 is employed in combination with this, the fixture strength can be enhanced even more. Moreover, deflection of the optical fiber 2 due to its own weight can be suppressed by the thickness of the covering body 25, and thus the optical fiber 2 can be fixed in parallel to the substrates 1 and 6. As a result, less stress is generated at the optical coupling portion between the optical fiber 2 and the internal waveguide 16, whereby deterioration of the optical coupling efficiency is minimized. It should be noted that same advantageous effects can be obtained even when only the covering body 25 is fixed to the second substrate 6 with the adhesive 20.

The covering body 25 may be of a short type (with a length of 20 to 40 mm, for example) which is designed to be fitted on a part of the coating 23 in the vicinity of the through hole 8a in order to protect against bending of the coating 23 of the optical fiber 2 extended out of the through hole 8a of the shield case 8. The covering body 25 also may be of a long type covering the entire length of the coating 23 connecting the module with another module in order to protect the strength of the optical fiber 2 as a whole and to provide the optical fiber 2 with flame retardancy.

In the embodiment described above, the angle of gradient of the mirror portion 15 can be set to 45 degrees to improve the optical coupling efficiency.

When the first substrate 1 is formed of silicon (Si), the first groove 1a and the second groove 1b can be formed by anisotropic etching of the silicon. Using this method, the grooves can be formed by utilizing the crystal orientation of the silicon. Specifically, the mirror can be shaped with high precision in the first groove 1a, and the optical fiber 2 can be placed in the second groove 1b with reduced positional deviation.

A photosensitive resin can be used as the material for the internal waveguide 16. This enables less expensive and easier formation in comparison with an inorganic internal waveguide that is formed by repeating ion doping and deposition.

Further, a silicon oxide film can be formed on the surface of the first substrate 1 including the interior of the first groove 1a so that the core 17 of the internal waveguide 16 has a greater refractive index than that of the silicon oxide film. In this manner, the internal waveguide 16 can be formed easily by filling the first groove 1a with a material for forming the core 17 of the internal waveguide 16.

Figure 14A:
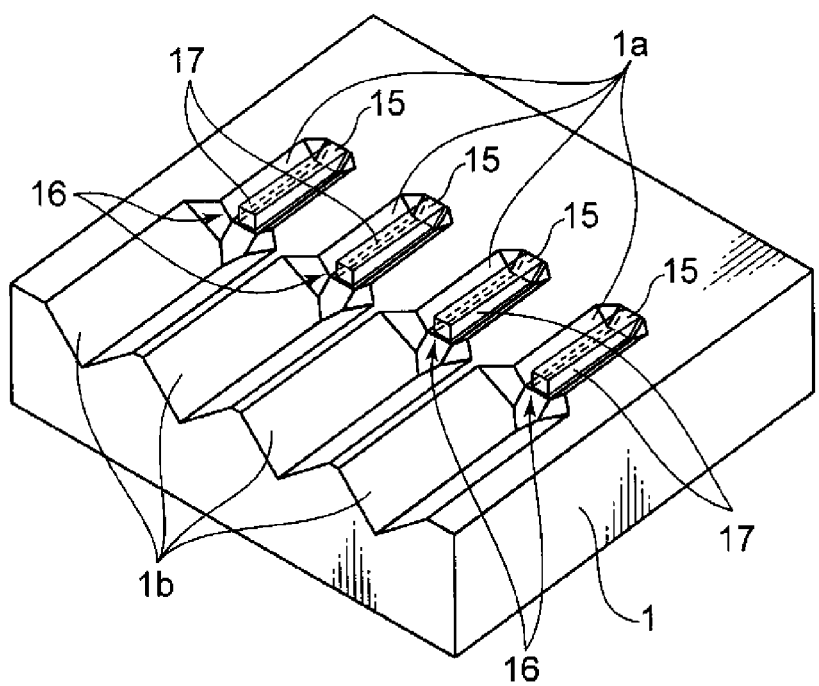
FIG. 14 are diagrams showing a first substrate according to another embodiment of the invention, FIG. 14A being a perspective view, FIG. 14B being a front cross-sectional view.
Figure 14B:
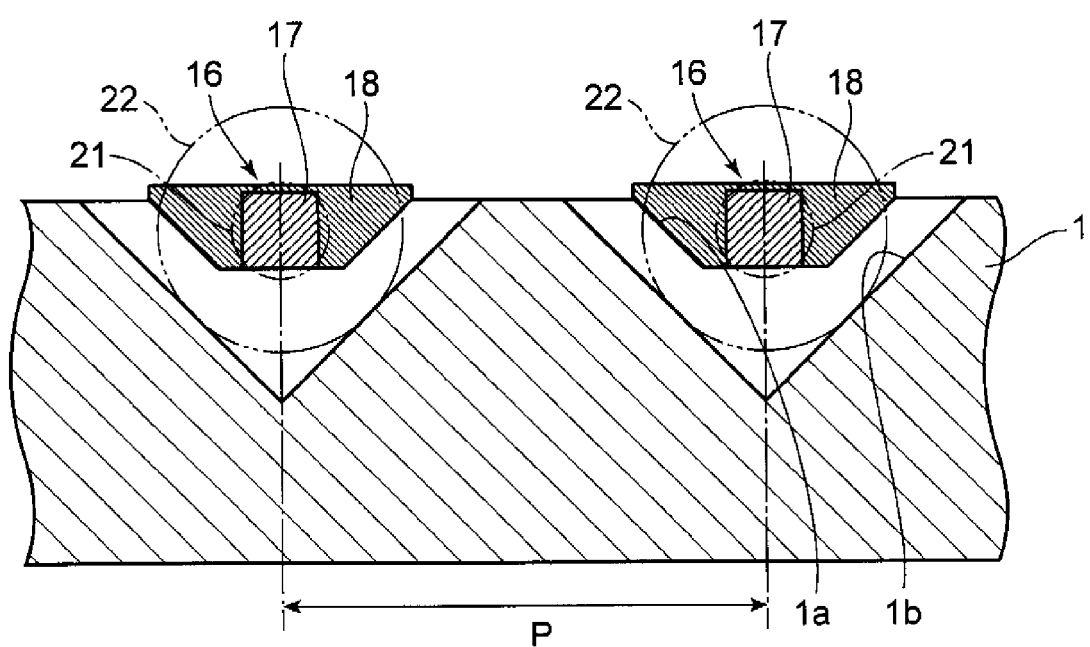

While the embodiment described above relates to an example in which one first groove and one second groove are formed in a single substrate, this invention is not related to this. As shown in FIGS. 14A and 14B, a plurality of first grooves 1a and a plurality of second grooves 1b can be formed, and the plurality of first grooves 1a are arranged in parallel while the plurality of second grooves 1b are arranged in parallel.

In the optical module shown in FIGS. 14A and 14B, a plurality of first grooves (grooves for formation of waveguides) 1a having a substantially trapezoidal cross-section are formed in the surface of the first substrate 1, as shown in FIG. 14A, such that they are arranged in parallel while being separated from each other by the material of the first substrate 1.

There are also formed, in the surface of the first substrate 1, a plurality of second grooves 1b having a substantially V-shaped cross-section and a greater depth than the first grooves 1a. Each of the second grooves 1b is formed in continuation of the end of the corresponding first grooves 1a so as to extend therefrom in a longitudinal direction.

As shown in FIG. 14A, a mirror portion 15 for changing the optical path is formed at the front end of each of the first grooves 1a. As shown in FIG. 14B, an internal waveguide 16 for optically coupling with the light emitting element 12a corresponding to this first groove 1a is formed in the interior of each of the first grooves 1a.

The internal waveguide 16 is composed of a core 17 for propagating light, having a high refractive index and having a substantially square cross-section, and a cladding 18 having a lower refractive index than the core 17. As shown in FIG. 14B, the left and side faces (opposite side faces) of the core 17 are covered with the cladding 18. The top surface of the core 17 is also covered with a thin cladding 18.

In the structure shown in FIGS. 14A and 14B, the plurality of first grooves 1a are arranged in a state where they are separated from each other by the material of the first substrate 1, which makes it possible to suppress leakage (crosstalk) of an optical signal passing through each of the first grooves 1a to its adjacent first groove 1a.

As shown in FIG. 14B, the distance P between the cores 17 of the adjacent internal waveguides 16 is not particularly limited according to this invention, and can be set to an arbitrary value. For example, the distance P between the cores 17 may be set to about 250 μm in consideration of the fact that optical fibers in most of conventionally known optical fiber arrays are arranged at intervals of 250 μm.

The size of the second grooves 1b is not particularly limited in this invention. In consideration of the fact that an outer diameter of most commonly used thin optical fibers is 125 μm, the size of the second grooves 1b may be set to a value corresponding to the size of an optical fiber having a cladding 22 with an outer diameter of about 125 μm. In order to prevent the crosstalk, the second grooves 1b also should desirably be separated from the adjacent second grooves 1b as shown in FIG. 14.

Figure 15:
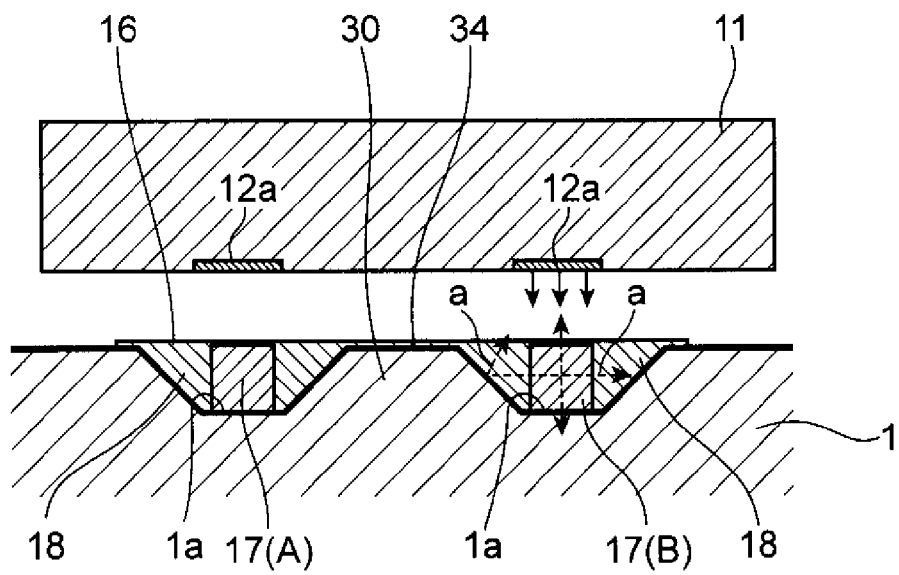
FIG. 15 is a diagram showing a first substrate according to still another embodiment of the invention, and is a cross-sectional view of the first substrate having an oxide film layer formed all over the surface thereof.

Further, FIG. 15 illustrates an optical module according to still another embodiment of the invention, wherein a plurality of first grooves 1a are arranged and an oxide film layer 34 is formed on the entire surface of the substrate 1 (specifically, the entire surfaces of the first grooves 1a and the entire surfaces of the shielding portions 30). Each of the shielding portions 30 is a projection projecting upward between the first grooves 1a in the substrate 1, and shields a scattered component a of reflected light from a mirror portion 15 from being leaked between the first grooves 1a.

The oxide film layer 34 is capable of reflecting an optical signal to prevent the optical signal from being leaked out of the first grooves 1a, and is also capable of preventing leakage of the scattered component a of the light reflected by the mirror portions 15. According to this structure, the oxide film layer 34 functions as a reflection layer reflecting an optical signal, whereby the leakage (crosstalk) of the optical signal can be suppressed. Technically, an optical signal constituted by infrared light or the like has a property of passing through the substrate 1 made of silicon or the like while being attenuated. The crosstalk suppression effect can be enhanced by the oxide film layer 34 reflecting the optical signal as described above.

Although in FIG. 15, the gap between the substrate 1 and the optical element 11 having light emitting units 12a is illustrated exaggeratedly greater than its actual size in order to facilitate visual perception of the optical path. Actually, this gap is so minute that significant crosstalk will not occur therein. The same applies to FIGS. 16 and 17.

Figure 16:
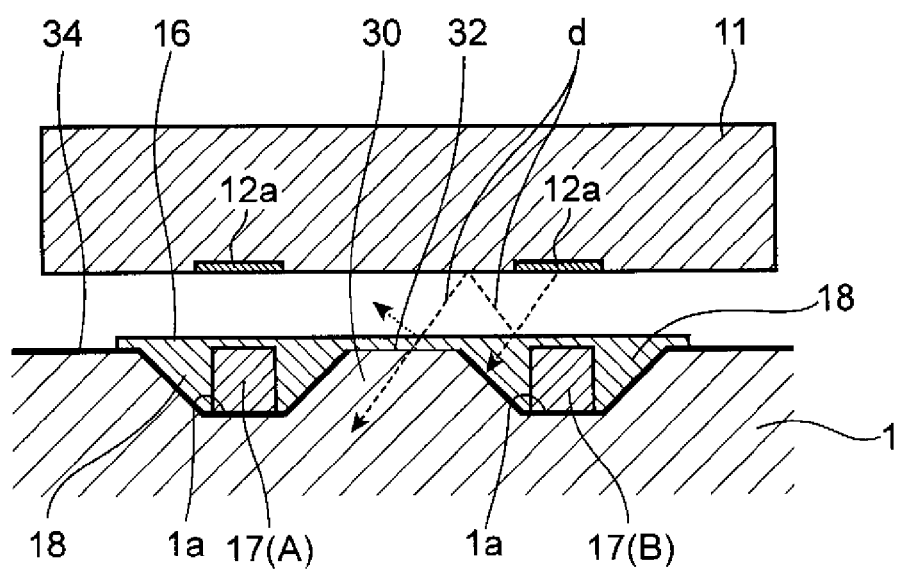
FIG. 16 is a diagram showing a first substrate according to still another embodiment of the invention, and is a cross-sectional view of the first substrate in which a removed portion is formed in an oxide film layer formed on the surface of the substrate by removing a portion of the oxide film layer corresponding to a shielding portion.

FIG. 16 illustrates an optical module according to still another embodiment of the invention, wherein an oxide film layer 34 is formed on the surface of the substrate 1 as shown in FIG. 15, and the oxide film layer 34 is partially removed from the surface of the shielding portion 30 projecting upward, whereby a removed portion 32 is formed. According to this structure, even if leakage light d is generated which is multiply reflected between the cladding 18 and the optical element 11 having the light-emitting units 12a, this leakage light d can be absorbed into the first substrate 1 through the removed portion 32 of the oxide film layer 34.

Figure 17:
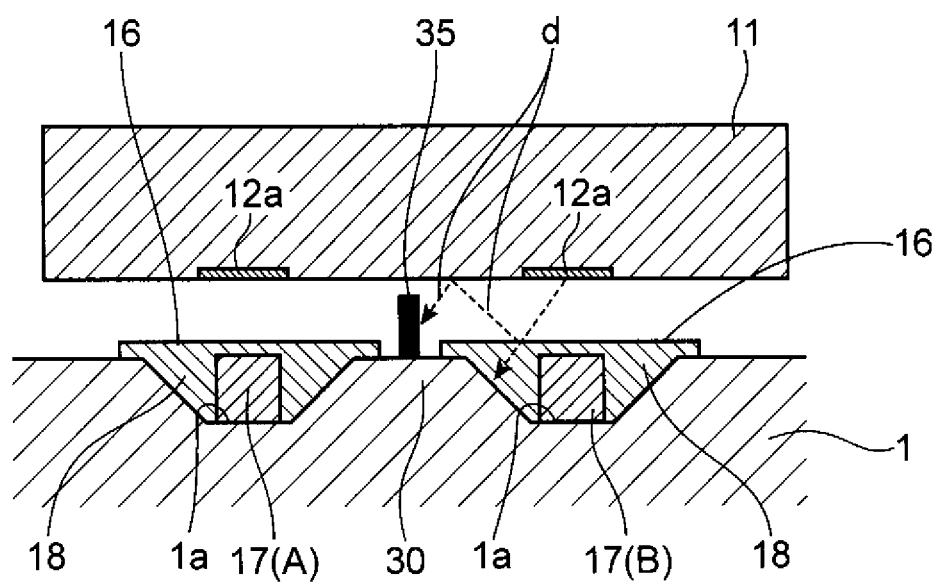
FIG. 17 is a diagram showing a first substrate according to still another embodiment of the invention, and is a cross-sectional view of the first substrate having a light absorber arranged in the shielding portion.
Figure 18A:
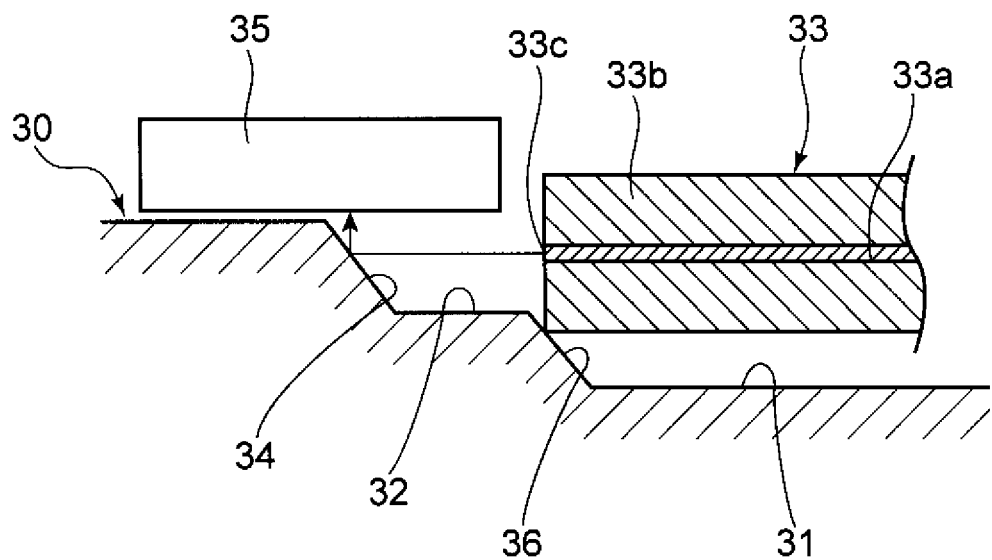
FIG. 18 are diagrams showing an optical module described in Patent Document 1, FIG. 18A being a side cross-sectional view, FIG. 18B being a front cross-sectional view.
Figure 18B:
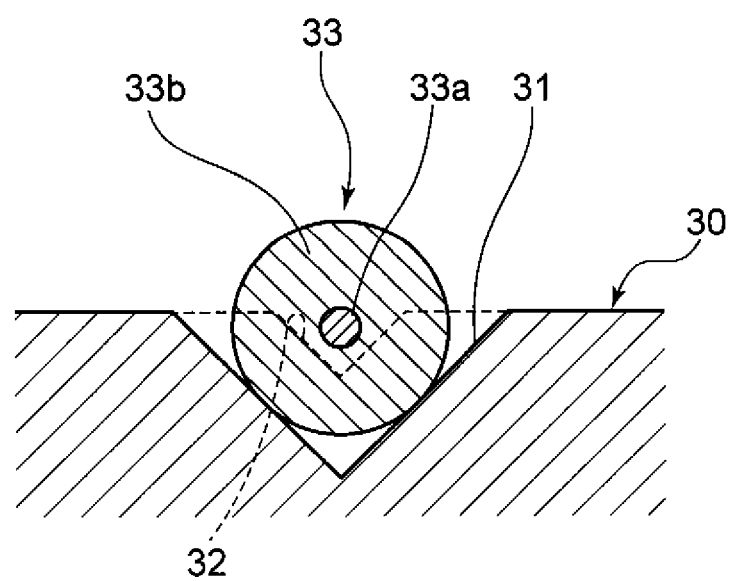

FIG. 17 illustrates an optical module according to still another embodiment of the invention, wherein a light absorber 35 is arranged on the surface of the shielding portion 30 projecting upward from the first substrate 1 such that the light absorber 35 extends along the shielding portion 30. The light absorber 35 is made of a non-translucent acrylic or epoxy resin, for example. According to this structure, even if leakage light d is generated which is multiply reflected between the cladding 18 and the optical element 11 having the light-emitting units 12a, this leakage light d can be absorbed by the light absorber 35 and leakage of light can be prevented.

The optical element 11 is not limited to the one that has light emitting elements 12a arranged in an integral array. The light emitting elements 12a may be separated from each other, or the light emitting elements 12a and the light receiving element 12b may be mounted together. Further, a plurality of the mirror portions 15 need not necessarily be arranged on the same line. For example, the length of the first groove 1a and internal waveguide 16 is made different from that of an adjacent channel, while the mirror portions 15 and the light emitting elements 12a or 12b are arranged offset relative to each other, whereby the crosstalk suppression effect can be enhanced even more.

As described above, the optical module according to the embodiments of the invention is characterized by including: a substrate having in its surface at least one first groove and second groove which is deeper than the first groove and has a substantially V-shaped cross-section, the first and second grooves being formed in continuation; an internal waveguide formed in the interior of the first groove in the substrate; a mirror portion provided at the front end of the first groove for changing an optical path; an optical element mounted on the surface of a substrate so as to face the mirror portion, the optical element being for emitting an optical signal to a core of the internal waveguide via the mirror portion, or for receiving an optical signal from the core of the internal waveguide via the mirror portion; and an optical fiber having a fiber core optically connected to a cladding placed in the second groove and the core of the internal waveguide.

According to this configuration, an internal waveguide having a core is provided in the first groove in the substrate, and a fiber core of an optical fiber arranged in the second groove in the substrate is optically connected to the core of the internal waveguide. When an optical element is a light emitting element, an optical signal is emitted to the core of the internal waveguide via the mirror portion, whereas when an optical element is a light receiving element, the optical signal from the core of the internal waveguide is received via the mirror portion.

Thus, the internal waveguide is interposed between the mirror portion and the front end of the fiber core of the optical fiber, and therefore neither a light flux emitted by the light emitting element nor a light flux emitted from the fiber core of the optical fiber is expanded. Accordingly, the propagation loss of the optical signal is substantially eliminated between the mirror portion and the front end of the fiber core of the optical fiber, resulting in improvement of the optical coupling efficiency.

When the optical element is the light emitting element, the core of the internal waveguide can be tapered to form such slopes that the width between the opposite side faces of the core is decreased gradually from the mirror portion toward the connection end with the fiber core of the optical fiber.

Thus, when the optical element is a light emitting element, it is made possible to converge a light flux emitted by the light emitting element by tapering the core of the internal waveguide. Accordingly, the optical coupling efficiency can be improved even more.

Further, when the optical element is a light receiving element, the core of the internal waveguide can be formed to form such slopes that the width between the opposite side faces of the core is gradually decreased from the connection end of the fiber core of the optical fiber toward the mirror portion.

Thus, it is made possible to converge the light flux emitted by the fiber core of the optical fiber by reversely tapering the core of the internal waveguide when the optical element is a light receiving element. Accordingly, the optical coupling efficiency can be improved even more.

Additionally, the width of the core of the internal waveguide can be smaller than the width of the upper end of the first groove If the width of the core of the internal waveguide is the same as the width of the upper end of the first groove, a light flux from the optical element may possibly be expanded in a width direction within the core, and part of the light flux may not reach the fiber core of the optical fiber. Therefore, the width of the core should be set smaller than the width of the upper end of the first groove, and preferably set to substantially the same value as that of the fiber core so that substantially the entire light flux is allowed to reach the fiber core of the optical fiber. Accordingly, the optical coupling efficiency can be improved.

The first groove can be formed into a substantially trapezoidal shape in cross section and the width of the bottom face of the first groove can be wider than that of the core of the internal waveguide.

In this configuration, since the width of the bottom face of the first groove is wider than the width of the core of the internal waveguide, undesirable reflection at the bottom face can be eliminated when the core of the internal waveguide is patterned (photo-cured) during formation of the core, and hence the core can be shaped with high precision. Incidentally, when the groove is a V-groove as described in Patent Document 1, light will be reflected, resulting in significant deterioration of patterning precision.

A third groove which has a substantially V-shaped cross-section and is deeper than the second groove can be formed in continuation from the second groove in the surface of the substrate, and the coating of the optical fiber can be placed in the third groove.

Thus, the coating of the optical fiber also can be placed in the third groove of the first substrate, whereby stress from the optical fiber can be prevented from concentrating at the boundary with the coating of the fiber cladding.

Further, the aforementioned substrate can be placed on another substrate having a greater size than that of the substrate, and the coating of the optical fiber can be fixed to this another substrate.

According to this configuration, since the coating of the optical fiber can be placed on and fixed to another substrate, the fixture strength of the optical fiber can be enhanced. Further, even if bending force or tensile force from the outside of the module acts on the optical fiber, the optical coupling portion with the internal waveguide is not affected. Accordingly, no deterioration is caused in the optical coupling efficiency.

Further, the configuration may be such that the aforementioned substrate is placed on another substrate having a greater size than this substrate, the covering body is fixed to the outer periphery of the coating of the optical fiber, and the covering body is fixed to the another substrate.

In this case, since the covering body is placed on and fixed to the another substrate, the fixture strength of the optical fiber is enhanced. Further, even if bending force or tensile force from the outside of the module acts on the optical fiber, the optical coupling portion with the internal waveguide is not affected. Accordingly, no deterioration is caused in the optical coupling efficiency. Moreover, deflection of the optical fiber due to its own weight can be suppressed by the thickness of the covering body, and thus the optical fiber can be fixed in parallel to the respective substrates. As a result, less stress is generated at the optical coupling portion between the optical fiber and the internal waveguide, whereby deterioration of the optical coupling efficiency is minimized.

Further, the configuration may be such that the plurality of the first grooves can be separated from each other and arranged on the substrate.

In this case, since the plurality of the first grooves 1*a* are arranged in a mutually separated fashion, occurrence of a phenomenon so-called crosstalk in which an optical signal passing through each of the first grooves 1*a* leaks out and exerts influence on an optical signal passing through the adjacent first groove 1*a* can be prevented. This improves the optical coupling efficiency in each of the first grooves 1*a*.

EXPLANATION OF REFERENCE NUMERALS

1 First substrate
1*a* First groove
1*b* Second groove
1*c* Third groove
2 Optical fiber
6 Second substrate (another substrate)
12*a* Light emitting element (optical element)
12*b* Light receiving element (optical element)
15 Mirror portion
16 Internal waveguide
17 Core
18 Cladding
21 Fiber core
22 Fiber cladding
23 Coating
25 Covering body
W1 to W3 Width

The invention claimed is:

1. An optical module comprising:
a substrate having in a surface thereof at least one first groove and a second groove which has a substantially V-shaped cross section formed deeper than the first groove, and which is formed in continuation from the first groove;
an internal waveguide which is provided within the first groove of the substrate, and which has a core and a cladding having a lower refractive index than the core, the opposite side faces of the core being covered with the cladding;
a mirror portion for changing an optical path, provided at a front end of the first groove;
an optical element mounted on the surface of the substrate so as to face the mirror portion, and designed to (i) emit an optical signal to a core of the internal waveguide via the mirror portion or (ii) receive an optical signal from the core of the internal waveguide via the mirror portion; and
an optical fiber having a fiber cladding placed within the second groove and a fiber core optically connected to the core of the internal waveguide,
wherein the width of the core of the internal waveguide is smaller than the width of the upper end of the first groove.

2. The optical module according to claim 1, wherein when the optical element is a light emitting element, the core of the internal waveguide is tapered to form such slopes that the width between opposite side faces of the core becomes gradually smaller from the mirror portion toward a connection end of the core with the fiber core of the optical fiber.

3. The optical module according to claim 1, wherein when the optical element is a light receiving element, the core of the internal waveguide is tapered to form such slopes that the width between opposite side faces of the core becomes gradually smaller from a connection end of the core with the fiber core of the optical fiber toward the mirror portion.

4. The optical module according to claim 1, wherein the first groove has a substantially trapezoidal cross-section, and a bottom face of the first groove has a greater width than the width of the core of the internal waveguide.

5. The optical module according to according to claim 1, wherein
a third groove having a substantially V-shaped cross section formed deeper than the second groove is formed in continuation from the second groove in the surface of the substrate; and
a coating of the optical fiber is placed within the third groove.

6. The optical module according to according to claim 1, wherein the substrate is placed on another substrate having a greater size than the substrate, and the coating of the optical fiber is fixed to the other substrate.

7. The optical module according to claim 5, wherein the substrate is placed on another substrate having a greater size than the substrate, and the coating of the optical fiber is fixed to the other substrate.

8. The optical module according to claim 1, wherein the substrate is placed on another substrate having a greater size than the substrate, a covering body is fixed to the outer periphery of the coating of the optical fiber, and the covering body is fixed to the other substrate.

9. The optical module according to claim 1, wherein a plurality of first grooves are arranged on the substrate while being separated from each other.

* * * * *